UNITED STATES PATENT OFFICE 2,640,850

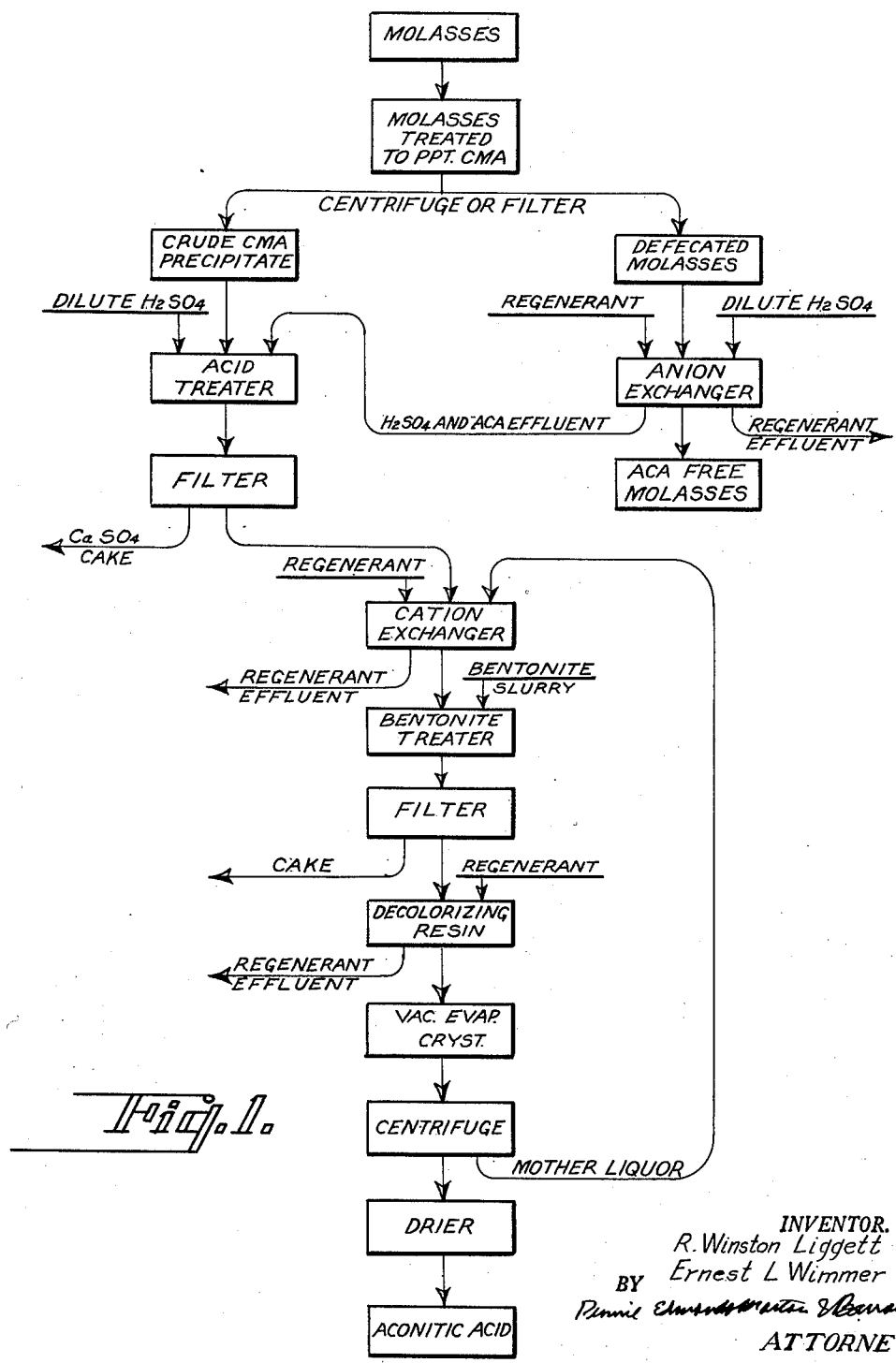

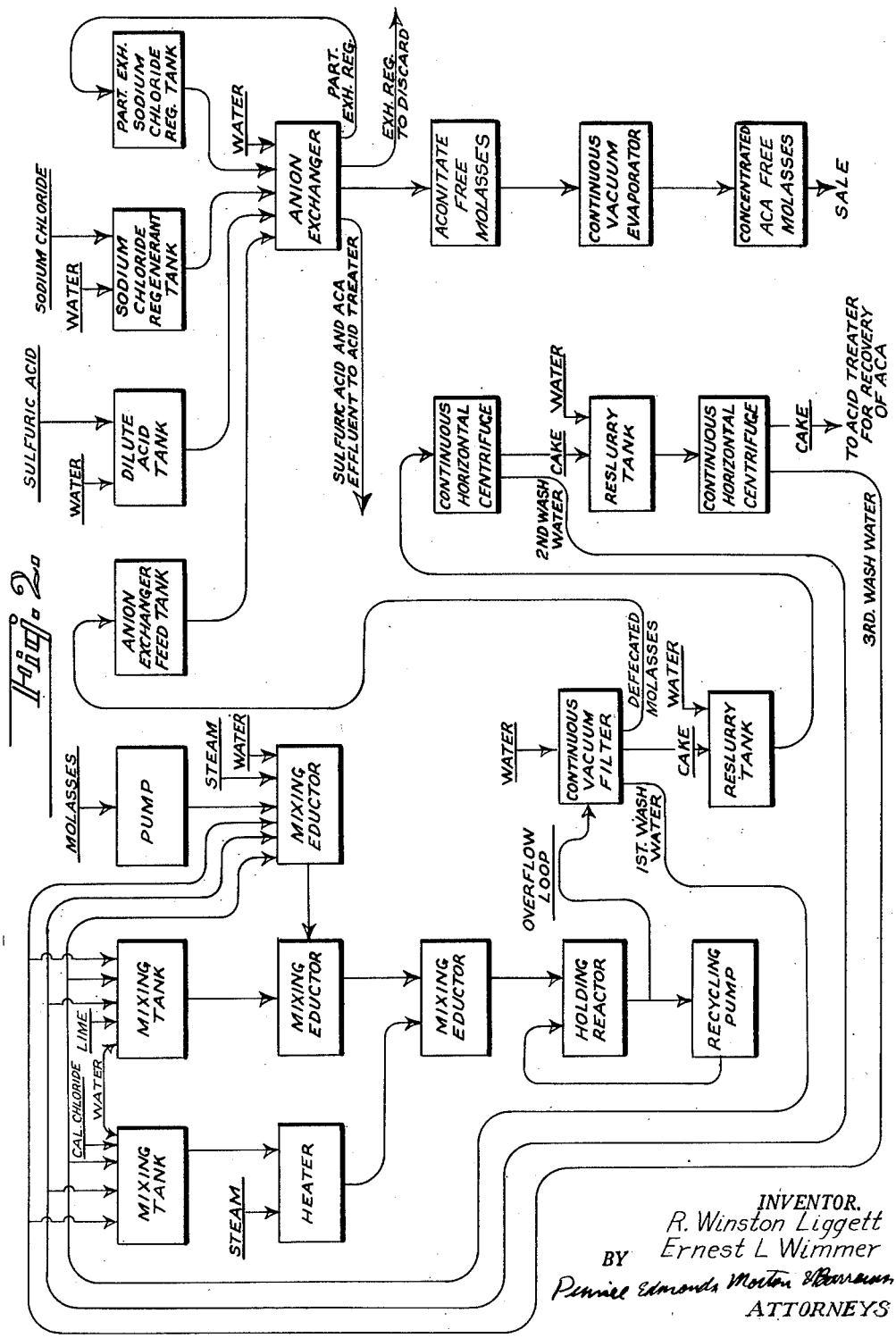

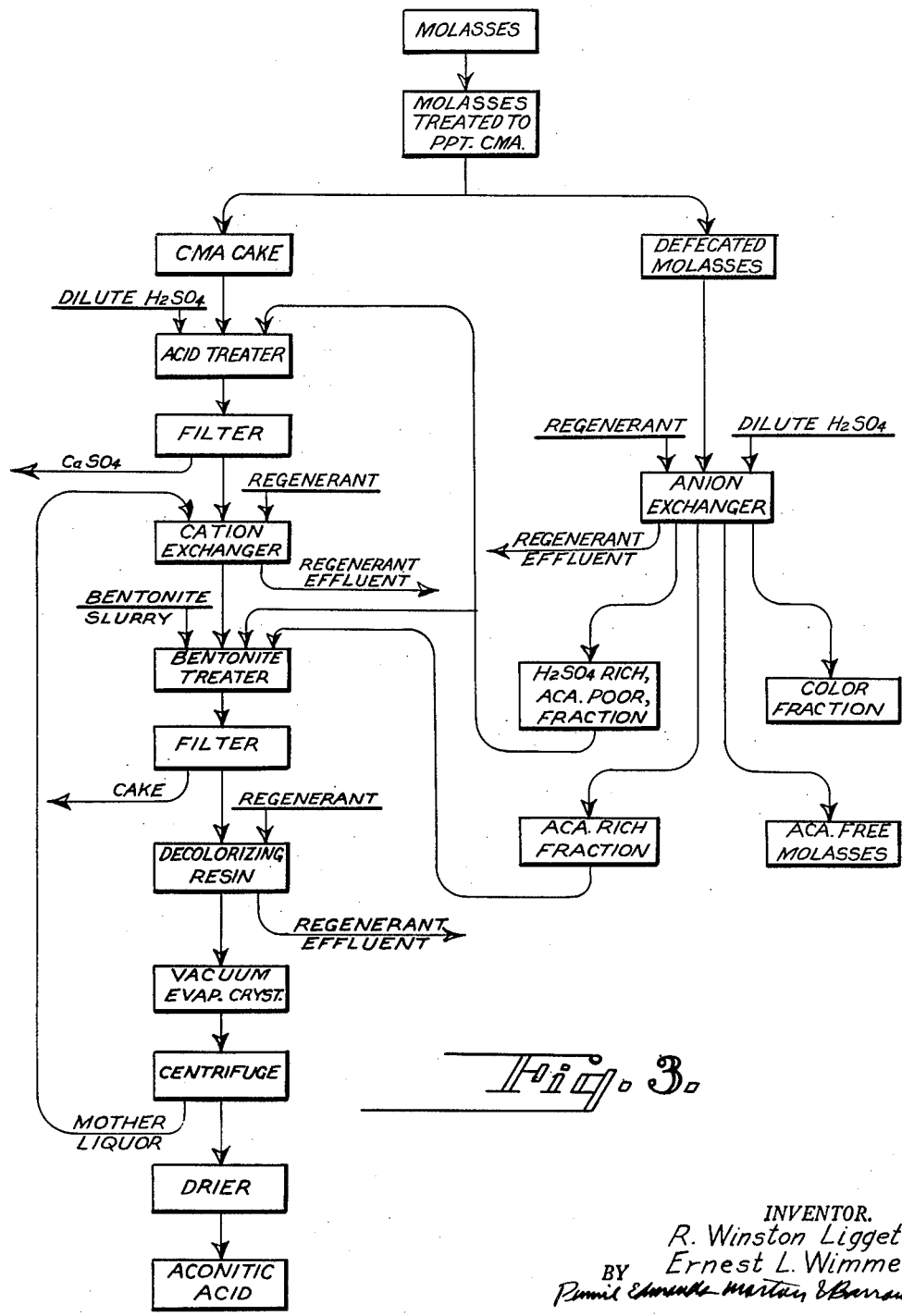

RECOVERY OF ACONITIC ACID FROM MOLASSES

Robert Winston Liggett, Whitemarsh Village, Wyndmoor, and Ernest L. Wimmer, Springfield, Pa., assignors to The American Sugar Refining Company, New York, N. Y., a corporation of New Jersey Application August 12, 1950, Serial No. 179,061

8 Claims. (Cl. 260—527)

This invention relates to the recovery of aconitic acid from molasses and more particularly from blackstrap molasses, whereby aconitic acid or its salts and complex salts as they occur in molasses may be recovered with a maximum yield, without detracting from the value of the molasses.

According to the present invention, blackstrap molasses, after dilution, is treated to precipitate alkaline earth aconitates therefrom, leaving part of the aconitic acid in the form of soluble compounds in the molasses, and the resulting molasses is then passed through an anion exchanger to remove the remaining aconitic acid therefrom, with recovery of the aconitic acid from the anion exchanger by treatment with a mineral acid, and particularly sulphuric acid, to form an effluent containing sulphuric acid and aconitic acid.

The invention also includes a further improved process in which the effluent solution of sulphuric and aconitic acid is used to treat the insoluble alkaline earth aconitates to set free aconitic acid therefrom.

The invention includes various steps and combinations and sub-combinations of steps whereby blackstrap molasses can be subjected to a series of treatments for recovering essentially all of the aconitic acid therefrom.

Aconitic acid is a tricarboxylic unsaturated acid and is of special interest in the production of resins, plastics, plasticizers, flavors, etc. It occurs naturally in low concentrations in the juices of the sugar cane and varieties of sorghum. When these juices are processed for the recovery of sugar, the aconitic acid is concentrated in the molasses which remains after the sugar extraction. Methods of treating molasses or other sugar-containing materials for the precipitation of alkaline earth aconitates therefrom are described in U. S. Patents Nos. 2,469,090, 2,359,537, 2,280,085 and 2,481,557. In all such precipitation processes, there is a residual amount of soluble aconitic acid in the molasses. The amount of soluble aconitic acid remaining in the molasses may be equal to, greater than, or less than the amount precipitated as the insoluble alkaline earth aconitates.

The present invention provides an improved process in which the aconitic acid is recovered from the defecated or residual molasses, remaining after the precipitation of aconitates therefrom by passing the molasses through an anion exchanger containing an anion exchange resin which will remove the aconitic acid from the molasses and form resin aconitates, leaving the molasses in a substantially aconitic acid-free state. The aconitic acid is separated from the resin by treatment with a mineral acid, particularly sulphuric acid, to give a solution containing both sulphuric and aconitic acid. And this acid mixture is advantageously used for treating the precipitated alkaline earth aconitates, whereby the aconitic acid from the aconitates and the aconitic acid from the subsequent resin treatment are recovered together as an aconitic acid product of the process.

The complete process of the present invention accordingly includes the following steps: first, a defecation or precipitation step by which the molasses is freed from part of its aconitic acid content by precipitation of insoluble alkaline earth salts; a second step by which the molasses, after such precipitation treatment, is passed through an anion exchanger to remove the remainder of the aconitic acid therefrom, giving a molasses substantially free from aconitic acid compounds; a third step in which the resin aconitate, resulting from the passage of the molasses through the anion exchanger, is treated with mineral acid, advantageously sulphuric acid, to remove the aconitic acid in the form of a solution which also contains a considerable amount of sulphuric acid; and a fourth step in which the acid from the third step is utilized in treating the precipitate from the first step, whereby, the sulphuric acid content of the former and the calcium content of the latter are concurrently minimized by precipitation of calcium sulfate.

Different methods of treatment can be used in the first step of the process for partially purifying or defecating the molasses and precipitating insoluble aconitates therefrom. In general, the molasses is diluted, e. g. to around 50° Brix and the precipitation is effected by heating the diluted molasses. With some kinds of molasses, particularly various molasses from Cuba, a dilution to about 50° Brix and heating to 90° C. for about one hour will result in precipitating the greater part of the aconitic acid in the form of insoluble aconitates, primarily calcium magnesium aconitates. With other types of molasses, the molasses, after dilution and before heating, is advantageously treated by adding lime to give a pH range of about 6–7, and by adding a soluble calcium salt such as calcium chloride, followed by heating the molasses. This first precipitation step can advantageously be carried out in accordance with the process set forth in the companion application of Robert E. Miller, Ser. No. 179,065 filed August 12, 1950, by diluting the blackstrap molasses to around 50–55° Brix, adding approximately 10% calcium oxide slurry to give a pH of around 7.0, and an amount of 15–30% calcium chloride solution so that the total calcium present is about 1.5 equivalents of calcium per equivalent of aconitic acid in the molasses, adding a small percentage of fresh seed crystals of the insoluble aconitates, and heating the molasses to around 90° C. for 1–2 hours. Yields of calcium magnesium aconitate have been obtained in this way amounting to as much as 75% of the total aconitic acid content of the molasses, leaving only about 25% of the original aconitic acid content in the defecated molasses.

Preliminary tests on the molasses will indicate whether a simple heating, without further treatment, will give a large part of the aconitic acid content in the form of insoluble aconitates, or whether further treatment with lime and calcium chloride is desirable.

After the molasses has been heated and the alkaline earth aconitates precipitated therefrom, the crude precipitate is separated from the molasses by centrifugation or filtration. This leaves the molasses in a defecated form and relatively free from colloids and suspended solids before it is passed to the anion exchanger. The crude precipitate produced in the defecation procedure is washed with water until free from sugars. And where this crude precipitate is to be subsequently treated with sulphuric acid to set free the aconitic acid from the aconitates, the precipitate is advantageously washed repeatedly to eliminate as much as possible of the soluble coloring materials which it contains.

The defecated molasses is passed through an anion exchanger containing an anion exchange resin, advantageously a weakly basic resin in a salt form. While strongly basic or salt splitting resins can be utilized as well as weakly basic resins in the free base form, such resins are less desirable and advantageous, and accordingly the basic resins are used in a salt form. Both weak base and strong base resins have good capacity for aconitate when the chloride form of the resin is used in a column operation; but much better results are obtained by weak base resin salts than with strong base resin salts. We have found that with weak base resins in salt form the aconitic acid can be removed with substantial completion from the molasses in a single cycle.

We have further found that aconitic acid may be readily eluted from a weak base resin in concentrated form with mineral acids such as sulphuric or hydrochloric.

A weak base resin which has been found advantageous is a polyamine modified phenol-formaldehyde type resin such as described in U. S. Patent No. 2,402,384, and such as is marketed under the trade name "Amberlite IR4B." Other weakly basic resins include resins with a polystyrene-divinyl-benzene base, such as "Dowex 3" and "Amberlite IR45" and also resins such as "Permutite Deacidite" and "Ionac 293M." Such resins are advantageously used in the form of a salt such as the chloride or sulphate, the chloride form being more advantageous.

In passing the defecated molasses through the anion exchanger, the aconitic acid of the molasses exchanges with the chlorine of the resin to form the resin aconitate. By sufficiently prolonged countercurrent flow, or by using a series of anion exchangers, practically all of the aconitic acid content of the molasses can be recovered in the form of resin aconitate, while the resin exerts substantially its maximum combining capacity for the aconitic acid.

The molasses passing from the ion exchanger and freed from aconitic acid contents can be reconcentrated to approximately its initial concentration and will have substantially the same food value and other values as the raw materials treated, except for the elimination of the aconitic acid and certain other compounds therefrom.

The resin aconitate resulting from the passing of the molasses through the anion exchanger, after washing the removed molasses, can be eluted with either sulphuric or hydrochloric acid or other mineral acid. The eluate will contain an excess of the mineral acid along with the aconitic acid. The amount of mineral acid required for thus removing the aconitic acid from the resin is such that it can advantageously be used for treating the crude calcium magnesium aconitates precipitated in the first step of the process. Dilute sulphuric acid is advantageously used as the eluant, so that the resulting effluent containing the excess sulphuric acid and also containing the aconitic acid can be used to treat the crude calcium magnesium aconitate.

The acid used for elution of the resin may vary from 2–25%, preferably 4–15%. An elevated temperature accelerates the rate of elution and makes it possible to obtain fractions of higher aconitic acid-sulphuric acid ratio. The maximum temperatures should be below that which will destroy the stability of the resin employed. With certain resins such as the polystyrene-divinyl-benzene base type such as "Dowex 3" and "Amberlite IR45" maximum temperatures around 95–100° C. are satisfactory. With resins such as "Amberlite IR4B" which are unstable at higher temperatures, the elution should not go above about 50° C.

The resin, after removal of the aconitic acid by elution with sulphuric acid, is readily converted back to the chloride form for reuse by a rinse with 3 to 10% brine solution. The temperature used in passing the molasses through the resin is preferably around 65–90° F. The rate of flow of the molasses will depend upon the design of the ion exchange equipment and operating technique. The strength of sulphuric acid used for the elusion of the resin to remove the aconitic acid therefrom is advantageously a 10% solution of sulphuric acid, but this can be varied.

In the accompanying drawings are shown diagrammatic flow sheets showing the various steps of the process in a somewhat conventional and condensed manner.

In the drawings:

Fig. 1 is a flow sheet showing the complete process with return of all of the sulphuric acid and aconitic acid from the anion exchanger for the treatment of the crude aconitate;

Fig. 2 is a flow sheet omitting the steps of treating the aconitate precipitate with the acid from the anion exchanger but showing certain of the other steps of the process in somewhat more detail; and Fig. 3 is a flow sheet similar to that of Fig. 1, but with the separation of the products from the anion exchanger before the return of certain of these products for the treatment of the aconitate and the recovery of the aconitic acid.

In the flow sheet of Fig. 1, the blackstrap molasses is diluted and treated to precipitate the alkaline earth aconitates referred to as CMA (calcium magnesium aconitate). This treatment may be either by dilution and heating, where this is sufficient, or by adding lime and calcium chloride and seed crystals before heating, or other method of treatment to precipitate the calcium magnesium aconitates can be used.

After precipitation of the aconitates, they are separated, together with other colloidal or suspended matter, by a centrifuge or filter, giving on the one hand the crude calcium magnesium aconitate precipitate, and on the other hand the defecated molasses. The precipitate will be washed in the centrifuge or on the filter, or will be re-suspended in water and washed and again filtered or centrifuged to free it from adhering molasses and to wash out, as much as possible, the water soluble impurities in the precipitate. The precipitate then goes to the acid treater, where it is treated with dilute sulphuric acid which is advantageously the acid coming from the anion exchanger, supplemented by whatever additional dilute sulphuric acid may be needed.

The flow sheet shows the defecated molasses passing through the anion exchanger which, in practice, would have a series of towers or chambers which could be used successively and in series in a countercurrent manner, certain towers being eluted and regenerated while others are being used for extracting the aconitic acid from the molasses. From the anion exchanger the aconitic acid-free molasses is drawn off as a product of the process for subsequent re-concentration and use. After the anion exchanger has become charged with aconitic acid, dilute sulphuric acid such as 10% sulphuric acid is passed through it to remove the aconitic acid and to give an effluent containing the excess sulphuric acid used and also containing the aconitic acid. This effluent is returned to the acid treater where the sulphuric acid is used for treating the crude calcium magnesium aconitate and where the aconitic acid recovered from the anion exchanger is added to that set free from the aconitates by the sulphuric acid treatment.

This treatment of crude calcium magnesium aconitates with sulphuric acid is advantageously carried out as described in companion application Ser. No. 179,052 by the use of an amount of sulphuric acid so that the calcium of the calcium magnesium aconitate will be precipitated as calcium sulphate, together with metals forming insoluble sulphates, and removed as a calcium sulphate cake, without leaving any substantial excess of sulphuric acid in the aconitic acid solution, but rather leaving part of the aconitic acid in the form of soluble magnesium acid aconitate.

In the flow sheet of Fig. 1, the slurry from the acid treater passes to the filter where the calcium sulphate cake is removed, and then to a cation exchanger where magnesium and other cations contained in the aconitic acid solution are removed, to give an aconitic acid solution substantially free from magnesium and other cations. The regeneration of the cation exchanger with a regenerant is also indicated conventionally in the flow sheet.

From the cation exchanger, the aconitic acid solution then passes to a bentonite treater where a small amount of bentonite slurry is added to aid in removing coloring material, followed by filtering to remove the bentonite cake. The solution then passes through a decolorizing resin, shown conventionally with its regenerant, for effecting further removal of coloring material, after which the aconitic acid solution is passed to a vacuum evaporator crystallizer, where the aconitic acid is crystallized, separated in a centrifuge, washed and dried to give the aconitic acid product. The mother liquor from the centrifuge is shown as being returned to the cation exchanger.

In the flow sheet of Fig. 2, the blackstrap molasses is shown as passing through the pump to the first mixing eductor, where it is diluted, e. g. to around 50° Brix, by water or by wash water from subsequent steps of the process, and where it is heated by steam. Two mixing tanks, one for lime and one for calcium chloride, are shown with water and wash water connections to form solutions of the calcium chloride and lime. From the first mixing eductor, the diluted molasses passes to the second mixing eductor where the lime from the lime mixing tank is added, and then to the third mixing eductor where the calcium chloride from the calcium chloride mixing tank is added after it has been heated by steam in a separate heater. From the third mixing eductor, the mixture passes to the holding reactor where it is held at a temperature of around 90° C. to precipitate the calcium magnesium aconitate. A recycling pump is shown for recycling and returning a small amount, e. g. 5%, of the crystals in the molasses leaving this step of the process, so that they supply seed crystals continuously to the fresh molasses entering the reactor.

After the precipitation has taken place in the reactor, the resulting slurry or suspension overflows to the continuous vacuum filter, where the aconitate precipitate is removed from the molasses and the defecated molasses then passes to the anion exchanger feed tank. The aconitate cake on the continuous vacuum filter is washed, and the wash water returned to the mixing tanks or first mixing eductor. The cake from the continuous vacuum filter is made into a slurry with water in the reslurry tank, then passed to a horizontal continuous centrifuge from which the cake passes to another reslurry tank where water is added and the resulting slurry then passes through a further continuous horizontal centrifuge, giving a resulting washed cake ready to go to the acid treater for recovery of the aconitic acid. The second and third wash waters from the continuous centrifuges are also returned to the mixing tanks or to the first mixing eductor.

The defecated molasses goes from the anion exchanger feed tank to the anion exchanger, where the aconitic acid is removed from the molasses in the form of resin aconitate. The resulting aconitate-free molasses passes to the evaporator feed tank and then to a continuous vacuum evaporator to give a concentrated aconitic acid-free molasses for sale or use.

The anion exchanger is shown diagrammatically and conventionally, but in practice there will be a series of such exchangers arranged in series so that some will be used for passing the molasses through them in a countercurrent manner, while others will be treated to remove the aconitic acid and to regenerate them. The dilute acid tank for supplying sulphuric acid diluted with water is shown leading to the anion exchanger to remove the aconitic acid therefrom in admixture with the excess sulphuric acid used, giving a sulphuric acid and aconitic acid effluent to go to the acid treater, which is not shown in this figure.

After passage of the sulphuric acid through the anion exchanger and subsequent washing with water, the resin is regenerated by a sodium chloride solution. In the flow sheet, a separate tank for the partially exhausted sodium chloride solution is used, with provision for returning the partially exhausted regenerant for reuse, as well as provision for discarding the exhausted regenerant.

The flow sheet of Fig. 3 is similar to that of Fig. 1, but with the further provision for separating the effluent from the anion exchanger into different products. When the dilute sulphuric acid first passes through the anion exchanger, it appears to act first on coloring material before setting free the aconitic acid. By passing a limited amount only of dilute sulphuric acid through the anion exchanger, a color fraction can be obtained of a volume which may be equal to or less than the volume of the resin in the anion exchanger. Thus, by fractionating the effluent from the anion exchanger when the dilute sulphuric acid is passed therethrough, a first fraction can be obtained high in coloring matter and with little or no aconitic acid in it. The next sulphuric acid which passes through the anion exchanger takes out most of the aconitic acid, to form a solution which is high in aconitic acid but low in sulphuric acid, and this fraction can also be recovered as an aconitic acid-rich fraction. As further amounts of sulphuric acid pass through the anion exchanger to remove the remainder of the aconitic acid, an effluent is obtained which is rich in sulphuric acid but poor in aconitic acid, and this fraction of the effluent is shown as being passed to the acid treater for use in treating the calcium magnesium aconitate cake, together with added dilute sulphuric acid, when needed.

The aconitic acid-rich fraction from the anion exchanger is shown as passing to the bentonite treater instead of to the acid treater. This aconitic acid-rich fraction is free from cations such as magnesium and does not, therefore, need to pass through the cation exchanger, through which the main product from the acid treatment of the aconitate cake passes.

In the flow sheets illustrated, the aconitic acid is first and partially removed from the molasses in the form of an insoluble alkaline earth aconitate, referred to in the drawings as CMA. The remainder of the aconitic acid is removed from the molasses in the anion exchanger, leaving the molasses in an aconitic acid-free state for reconcentration or other treatment or use.

The aconitic acid is recovered from the anion exchanger by the use of dilute mineral acid, particularly sulphuric acid. The resulting effluent, which contains both the excess sulphuric acid and the aconitic acid, is shown, in Fig. 1, as being returned to the acid treater for the crude aconitate; while in Fig. 3, most of the effluent is shown as so used, while a fraction high in aconitic acid is returned to a subsequent step in the treatment.

This use of the acid from the effluent of the anion exchanger for treating the precipitated aconitates makes it possible to recover the aconitic acid from both the precipitate and the effluent together. The aconitic acid recovered in the anion exchanger is combined with that which is set free from the aconitate by treatment with sulphuric acid, so that the entire aconitic acid content of the molasses is recovered in marketable form.

The invention will be further illustrated by the following specific examples, but it will be understood that the invention is not limited thereto.

*Example 1*

The blackstrap molasses used was a Cuban cane molasses which, on dilution and heating, gave a large proportion of its aconitic acid content in the form of alkaline earth aconitates. This molasses contained 3.51% aconitic acid, 0.55% calcium, and 0.40% magnesium. This molasses was diluted from 88 Brix to 50° Brix, heated to 90° and then held within the range of 85–95° C. for about 1 hour, with continuous agitation, to precipitate the complex calcium magnesium aconitate. This mixture was then centrifuged, and the precipitate washed. From 100 pounds of 88° Brix molasses there was obtained approximately 8 pounds of a crude wet precipitate containing the alkaline earth aconitates. This precipitate contained an equivalent of 2.4 pounds of aconitic acid, while the defecated molasses remaining after the removal of the precipitate contained residual dissolved aconitates equivalent to 1.1 pound of aconitic acid. This represents a recovery of about 68% of the aconitic acid in the form of calcium magnesium aconitate.

The molasses from the centrifugal operation was further diluted to 30° Brix and passed downwardly through a column of weakly basic resin in chloride form, this resin being the resin above referred to, sold under the trade-mark Amberlite IR4B. In a single column of this resin and with a rate of downflow of 0.25 volumes of molasses per volume of resin per minute, it was found that the resin would continue to remove practically all of the aconitic acid from the molasses until the resin had been nearly exhausted. The concentration of aconitic acid in the defecated molasses entering the tower was 0.3%, and that of the effluent molasses leaving the tower was 0.05% until the resin had been nearly exhausted, whereupon the aconitic acid content of the effluent rose rapidly to that of the influent. The resin retained approximately 5.1 pounds of aconitic acid per cubic foot of resin.

When the resin's capacity to remove aconitic acid had been exhausted, it was washed with six volumes of water to remove admixed or adhering molasses. A 10% sulphuric acid solution was then passed downflow over the backwashed resin bed to elute the aconitic acid. Over 80% of the aconitic acid retained by the resin was eluted by the first two volumes (two volumes per volume of resin) of sulphuric acid. The dilute acid was passed downwardly through the resin bed at a flow rate of 0.1 volume of the dilute sulphuric acid per volume of resin per minute. The resulting effluent solution contained approximately 3% aconitic acid and 6% sulphuric acid, and was used to extract the aconitic acid from the crude precipitate of alkaline earth aconitates obtained from the molasses.

The resin, after the elution with dilute sulphuric acid, was backwashed with water and rinsed with several volumes of 10% sodium chloride solution to convert it to the chloride form, and was then ready for reuse.

In the treatment of the crude calcium magnesium aconitate with dilute sulphuric acid, the amount of sulphuric acid should be sufficient to precipitate the calcium of the aconitates as calcium sulphate. In the above example, the amount of sulphuric acid from the elution of the resin is approximately that required for treating the amount of calcium magnesium aconitate precipitated in the first step of the process. The aconitic acid admixed with this sulphuric acid is added to that set free from the aconitates by the action of the sulphuric acid. In this example, approximately two-thirds of the total aconitic acid present in the molasses is precipitated as the insoluble alkaline earth aconitates, and one-third recovered by the anion exchanger, while the excess amount of sulphuric acid used in removing the aconitic acid from the anion exchanger was approximately that required for treating the aconitate precipitate.

As indicating the effectiveness of the resin in removing aconitic acid from the molasses, tests were made to show the aconitic acid content of the effluent molasses with continued flow of the molasses through a single bed of resin. In the first volume of molasses per volume of resin passed through the resin, the aconitic acid content was 0.03%. The influent molasses had 0.3% aconitic acid. After 19 volumes of molasses per volume of resin had passed through the resin, the aconitic acid content of the effluent was only 0.05%. After 21 volumes, it increased to 0.15%, after 22 volumes to 0.24% and after 23 volumes to 0.30%, indicating that one volume of this resin would remove the aconitic acid from approximately 19 volumes of molasses before exhausing the resin.

As illustrating the effect of the sulphuric acid used for removing the aconitic acid from the resin, it was found that when a 10% sulphuric acid solution was used, the first volume of acid per volume of resin passing through the resin contained 4.1% aconitic acid. The second volume contained 1.8%, the third 0.4% and the fourth 0.1%, indicating that the first two volumes of sulphuric acid removed practically all of the aconitic acid from the resin.

The treatment of the crude aconitate precipitate with the effluent sulphuric acid from the anion exchanger is in accordance with the method described in companion application Ser. No. 179,052 and is thus shown in the flow sheets of Figs. 1 and 3. The sulphuric acid used is sufficient to set free the aconitic acid in part and to precipitate the calcium as calcium sulphate, without leaving any substantial excess of sulphate or calcium ion in the solution. The calcium sulphate precipitate is filtered off, the solution passed through a cation exchanger to remove magnesium and other cations and, after treatment with bentonite and decolorizing resins to remove coloring material, the aconitic acid solution is evaporated to crystallize out the acid, which is the product of the process and includes the aconitic acid set free from the precipitated aconitates and also the aconitic acid recovered by the subsequent anion exchange treatment.

Example 2

The molasses treated was a Louisiana molasses of 74° Brix with 5.3% aconitic acid, 0.17% calcium and 0.53% magnesium. This molasses was diluted to 50° Brix, heated to 90° C., treated with lime to a pH of 7.0, and treated with 6.6 pounds of calcium chloride per hundred pounds of molasses. This amount of calcium chloride is sufficient to give a total calcium content of the reaction mixture equivalent to 150% of the aconitic acid present in the reaction mixture, or a total of 1.5 equivalents of calcium per equivalent of aconitic acid.

The diluted molasses was held at a temperature of 80-90° for two hours with continuous agitation to precipitate the complex calcium magnesium aconitate. The mixture was then centrifuged to give a crude wet precipitate of calcium magnesium aconitate, and the precipitate was thoroughly washed with water. From 100 pounds of 74.0° Brix molasses, 8.8 pounds of crude washed precipitate was obtained containing an equivalent of 3.5 pounds of aconitic acid. The molasses from the centrifuge contained 1.8 pounds aconitic acid per hundred pounds of original molasses.

The molasses from the centrifugal operation was diluted to 30° Brix and contained 0.7% aconitic acid. The molasses was passed downflow over a column of weak base ion exchange resin, as described in the preceding example, except that in this case the resin was in the sulphate salt form and the molasses, before passing to the anion exchanger, was first treated to reduce its calcium ion content to prevent column blockades by precipitation of calcium sulphate. This treatment was by passage of the molasses over a strongly acidic cation exchange resin in the form of its sodium salt, such as the resin known in the trade as Amberlite IR-120 converted to the sodium salt form by a rinse of 5 volumes of 10% sodium chloride solution. Approximately 1 cubic foot of resin is required to effect complete exchange of the calcium ion with sodium ion in the treated molasses arising from 100 pounds of the original 74° Brix molasses. After exhaustion, the resin is returned to the sodium salt form by a rinse with 10% sodium chloride. The molasses, depleted of calcium ions, is then passed over the sulphate salt of the weakly basic ion exchange resin to remove the aconitic acid.

The concentration of aconitic acid in the effluent molasses from the anion exchanger is reduced from 0.7% to around 0.05-0.3% until the break-through point is reached, and with further counterflow treatment, the effluent molasses can be continuously reduced to around 0.05%.

After the removal of the aconitic acid in the anion exchanger, the column is washed to remove molasses and regenerated with 10% sulphuric acid, using two volumes per volume of resin as in the previous example. The spent regenerant, containing about 3% aconitic acid and 6% sulphuric acid, is approximately sufficient for treating the precipitated alkaline earth aconitates to extract aconitic acid therefrom. The extract containing approximately 8.5% aconitic acid is treated to produce crystalline aconitic acid as described in the preceding example.

The resin, after washing, is in the sulphate form and ready to receive another cycle of influent molasses.

Example 3

The same molasses used in Example 2 was diluted to 50° Brix, heated to 90° C., treated with lime to a pH of 7.0 and held at around 90° C. with agitation for about one hour. After centrifuging and washing, 1.6 pounds of a crude wet precipitate was obtained, containing the alkaline earth salts of aconitic acid from 100 pounds of 74° Brix molasses. The precipitate contains an equivalent of .64 pounds of aconitic acid. In this case, the molasses from the centrifugal operation contained 4.6 pounds of aconitic acid per hundred pounds of original molasses. In this case, accordingly, only a relatively small percentage of the total aconitic acid was precipitated in the form of the insoluble alkaline earth aconitates.

The molasses from the centrifugal operation is diluted to 30° Brix and contains 1.1% aconitic acid. It is passed downflow through a column of weakly basic ion exchanger in the chloride salt form (using Amberlite IR4B) as in Example 1. When the resin's capacity to exchange chloride for aconitate is exhausted, it is washed to remove molasses and a 10% solution of sulphuric acid is then passed downflow at the rate of 0.1 volume of the dilute acid per volume of resin per minute, using a total of 2 volumes of 10% sulphuric acid per volume of resin to elute the aconitic acid from the resin and giving an effluent solution containing about 3% aconitic acid and 6% sulphuric acid, where the entire amount of effluent is collected together.

This amount of sulphuric acid is considerably in excess of that required for treating the relatively small amount of calcium magnesium aconitate precipitated in the first step of the process. The amount required for treating the precipitated aconitates can be used in the manner described in Example 1, and the remainder of the effluent from the anion exchanger can be admixed with the aconitic acid solution produced by the acid treatment of the aconitate, after this has been treated with a cation exchange resin to remove cations therefrom.

In this case, the effluent from the anion exchanger is advantageously divided into two parts; the first part of the effluent rich in aconitic acid is advantageously kept separate from the effluent which is poor in aconitic acid and rich in sulphuric acid. In the flow sheet of Fig. 3, two such fractions are shown, the aconitic acid-rich fraction going to the bentonite treater and mixing with the aconitic acid solution produced in the acid treater after this has been passed through the cation exchanger. The other portion of the effluent from the anion exchanger, which is rich in sulphuric and poor in aconitic acid, goes to the acid treater for treating the aconitate precipitate.

In Fig. 3, a third fraction from the anion exchanger is shown, namely, a color fraction. Where the sulphuric acid is added slowly and progressively to the body of resin aconitate in the anion exchanger, it appears to act first and preferentially on color constituents to remove them with the first portion of sulphuric acid passing through the exchanger, giving an initial color fraction which can be drawn off and kept separate, after which the greater part of the aconitic acid comes out in the next fraction as a relatively high aconitic acid fraction, and the remainder of the acid is recovered in the fraction poor in aconitic acid and rich in sulphuric acid.

In carrying out the elution of the resin aconitate with the 10–15% sulphuric acid eluant, the rate of elution is important and should advantageously be slow enough to allow the resin and the eluting solution to approach equilibrium conditions at all times during the elution cycle. The rate of flow should also be adjusted so as to minimize channeling. The optimum rate of flow will depend upon the dimensions of the resin bed and the size and shape of the resin particles, and is best determined experimentally. The rate of flow is advantageously that which will yield the maximum aconitate-eluant acid ratio.

By careful and controlled flow of the eluant acid, the main portion of the coloring constituents in the molasses, which are co-adsorbed on the resin with the aconitic acid, may be fractionally eluted prior to the appearance of aconitic acid in the eluate. The aconitic acid appears in the eluate after the pH drops below about 3.0. Prior to this time, there is little, if any, aconitic acid in the eluant, while a large proportion of the coloring matters are removed. And this fraction is advantageously kept separate, as shown in the flow sheet of Fig. 3, where the "color fraction" is one of the products from the anion exchanger. Thereafter, by careful control, the greater part of the aconitic acid is recoverable in one fraction, the volume of which is somewhat less than the volume of the resin bed. And this aconitic acid solution is obtained with only small amounts of sulphuric and other acids. Such a solution may contain around 8% of aconitic acid with only small amounts of sulphuric and other acids. The residual aconitic acid in the resin is diluted with e. g. around 1.5 volumes of eluate per volume of resin, to give a fraction low in aconitic acid and containing e. g. around 9.5% sulphuric acid. This fraction is advantageously returned, to the extent required, to the acid treater for treating the precipitated aconitates.

*Example 4*

The same molasses as in Example 2 is diluted to 50° Brix, heated to 90° C., treated with lime to a pH of 7.0, and treated with calcium chloride in the amount of 8.6 pounds per hundred pounds of 74° Brix molasses; and the mixture is seeded with 5% by volume of a preceding batch containing the precipitated aconitate to aid in the precipitation of the aconitate in the seeded molasses. The molasses so treated is held at a temperature of around 90° C. for about two hours, with resulting precipitation of calcium magnesium aconitates from the blackstrap molasses. In this case, the total calcium is about 180% of the theoretical, as calculated for $Ca_3Ac_2.6H_2O$ from the aconitic acid content of the molasses. When the treated molasses is centrifuged and washed, approximately 77% of the total aconitic acid is recovered in a crude precipitate of alkaline earth aconitates. From 100 pounds of original molasses, approximately 10.2 pounds of crude precipitate containing an equivalent of 4.1 pounds of aconitic acid are obtained.

The molasses containing 0.54% aconitic acid is passed downflow over a column of weakly basic ion exchange resin in the chloride salt form, as in Example 1. When the resin is exhausted, as indicated by the sharp increase in aconitate in the column effluent, the column is washed with water and then eluted with 10% sulphuric acid, using two volumes of acid per volume of resin. The aconitic acid from 100 pounds of original molasses is contained in 4.7 gallons of eluate containing about 3% aconitic acid and approximately 6% sulphuric acid. The eluate contains insufficient acid for complete extraction of the aconitic acid from the precipitate of alkaline earth aconitates, so that additional sulphuric acid is needed. Approximately 1.8 pounds of sulphuric acid is added to the eluate, and this solution is added to the crude precipitate of alkaline earth aconitates. The filtrate from the cake extraction contains approximately 11% aconitic acid. It is de-ashed, decolorized and crystallized, as illustrated, for example, in Figs. 1 and 3, or by other suitable procedure.

The resin, after elution with sulphuric acid, is washed with water and rinsed with several volumes of sodium chloride to prepare it for another cycle.

Example 5

The same molasses used in Example 2 is treated according to the procedure of the Ambler and Roberts U. S. Patent No. 2,481,557. 100 pounds of this molasses is diluted with 1.5 gallons of water, heated to 45° C., and calcium hydroxide added to a pH of 6.2. A solution of 6.4 pounds of calcium chloride ($CaCl_2.6H_2O$) and 2.2 pounds magnesium chloride ($MgCl_2.6H_2O$) in two gallons of water is added, and the temperature raised to 90° C. and held for 45 minutes for precipitation of the alkaline earth aconitates. The reaction mixture is 52° Brix. The wet precipitate recovered by centrifuging and washing weighed 5.0 pounds (from 100 pounds of molasses) and contained an equivalent of 2.0 pounds of aconitic acid. The molasses from the centrifuging operation contained about 0.85% aconitic acid.

The molasses from the centrifuge, after dilution to 30° Brix, is passed over a column of weak base ion exchange resin in the chloride salt form (Amberlite IR4B). After exhaustion of the resin's ability to exchange chloride for aconitate, it is washed with water and then a 10% sulphuric acid solution is passed over the resin in the amount of 2 volumes of acid solution per volume of resin. The acid eluate, containing about 3% aconitic acid and 6% sulphuric acid, is considerably in excess of the amount required for treatment of the aconitate precipitate, and only a part of this acid eluate is used for treating the precipitate. The filtrate obtained on treating the aconitate cake with the necessary amount of eluate sulphuric acid is de-ashed by passing over a cation exchange resin. The de-ashed effluent is combined with the remaining portion of the acid eluate from the anion exchanger and the combined liquors are decolorized and concentrated to produce crystalline aconitic acid, as illustrated in the flow sheets of Figs. 1 and 3, or by other suitable treatment.

The ratio of sulphuric acid to aconitic acid increases with the concentration and crystallization of aconitic acid, and the resulting mother liquors, with an increased sulphuric-aconitic acid ratio, may be used in making up the sulphuric acid solution for elution of aconitic acid from the exhausted weakly basic anion exchange resin. Only the sulphuric acid consumed in dissolving the alkaline earth aconitates and in displacing aconitate from the exhausted anion exchange resin needs to be replaced. In this example, approximately 5.5 pounds of sulphuric acid are consumed for every hundred pounds of 74° Brix molasses treated.

After elution of the aconitic acid from the weakly basic anion exchange resin with sulphuric acid, the resin is washed with 5 volumes of 10% sodium chloride solution to revert it to the chloride salt form, and it is now ready for another molasses cycle.

The foregoing examples illustrate treatments of different molasses by different methods of treatment, whereby the proportion of the total aconitic content of the molasses precipitated as insoluble calcium magnesium aconitate may be as high as two-thirds or more of the total aconitic acid or may be a much smaller amount. The examples illustrate relative proportions of aconitic acid precipitated as aconitate, and of aconitic acid recovered by anion exchange treatment and elution with sulphuric acid such that the amount of sulphuric acid present in the effluent is approximately equivalent to that required for treating the precipitated aconitate. This is an advantageous application of the process and is possible where the precipitation is arount two-thirds of the amount of aconitic acid in the molasses.

Where a lower proportion of alkaline earth aconitates is precipitated, and more of the aconitic acid recovered in the anion exchanger, the sulphuric acid from the elution of the resin aconitate may be considerably in excess of that required for treating the precipitated aconitate. In this case, the excess acid with its accompanying aconitic acid may be combined with the solution of aconitic acid from the acid treatment of the precipitate, to enable the entire amount of aconitic acid to be recovered in the same subsequent concentrating and crystallizing operation.

It will thus be seen that the present invention provides an improved multiple-stage process of recovering substantially all of the aconitic acid from blackstrap molasses by first precipitating more or less of the aconitic acid in the form of insoluble alkaline earth aconitates and then treating the resulting defecated molasses with an anion exchange resin to remove the remainder of the aconitic acid therefrom, giving a valuable molasses product which, on reconcentration, is comparable with the original blackstrap molasses except for the removal of aconitic acid and small amounts of other materials therefrom.

The method of treating the alkaline earth aconitate with sulphuric acid to recover the aconitic acid therefrom is similar to that described in companion application Ser. No. 179,052, but uses part or all of the aconitic acid-containing sulphuric acid effluent from the anion exchanger for supplying the acid for the treatment of the aconitate; and the process thereafter is one in which the aconitic acid from the anion exchange treatment is present, as well as the aconitic acid from the treatment of the aconitate, and the combined aconitic acid is recovered from the combined operations in a single crystallization operation.

While the invention has been more particularly described in connection with the treatment of blackstrap molasses, it is also applicable to the treatment of other molasses, such as B molasses and sorghum molasses for the recovery of aconitic acid therefrom, including blackstrap and other molasses of various origins such as Cuban, Puerto Rican, Hawaiian and Louisianian cane molasses and sorghum molasses.

We claim:

1. The process of treating molasses which comprises diluting and treating the same to precipitate part of the aconitic acid content thereof in the form of insoluble alkaline earth aconitates, passing the resulting aconitate-containing molasses in contact with an anion exchange resin, which resin has been converted to the salt form by treatment with a mineral acid, to separate the remainder of the aconitic acid therefrom as resin aconitate and to produce a substantially aconitic acid-free molasses, eluting the aconitic acid from the resin with dilute sulfuric acid to form an effluent containing sulfuric acid and aconitic acid, utilizing at least part of said effluent to treat the precipitated aconitates to remove calcium from the aconitates and sulfuric acid from the effluent in the form of calcium sulfate and to form a solution containing aconitic acid from both said effluent and said treatment of the aconitates, admixing with said solution any effluent which has not been utilized for said treatment of the aconitates, and concentrating the combined solutions to crystallize aconitic acid therefrom, whereby the sulfuric acid used first for the elution of the aconitic acid is used at least in part for treating the precipitated aconitates and whereby aconitic acid is recovered from both the precipitated aconitate and from the anion exchange treatment by the same crystallizing operation.

2. The process of treating molasses which comprises diluting and treating the same to precipitate part of the aconitic acid content thereof in the form of alkaline earth aconitates, passing the resulting aconitate-containing molasses in contact with an anion exchange resin, which resin has been converted to the salt form by treatment with a mineral acid, to remove the remainder of the aconitic acid therefrom and to give a substantially aconitic acid-free molasses, eluting the aconitic acid from the resin with dilute sulphuric acid to form an effluent containing sulphuric acid and aconitic acid, and utilizing at least part of such effluent acid to treat the precipitated aconitates to remove calcium from the aconitates and sulphuric acid from the effluent in the form of calcium sulphate.

3. The further improvement in the process of claim 2 in which the solution resulting from the treatment of the aconitate with the acid, after removal of calcium sulphate therefrom, is passed through a cation exchanger to remove cations and is decolorized and concentrated to crystallize aconitic acid therefrom, whereby aconitic acid is recovered from both the precipitated aconitate and from the anion exchange treatment by the same crystallizing operation.

4. The process according to claim 1 in which the aconitic acid is recovered from the resin aconitate by treatment with a dilute sulphuric acid solution and in which the effluent from such treatment is fractionally collected in a first fraction high in aconitic acid and low in sulfuric acid and in a subsequent fraction low in aconitic acid and high in sulfuric acid, and in which at least part of the latter fraction is used for treating the precipitated aconitates.

5. The process of treating blackstrap molasses which comprises diluting and heating the same to precipitate the greater part of the aconitic content thereof in the form of insoluble alkaline earth aconitates, separating the insoluble aconitates, passing the resulting aconitate-containing molasses in contact with a weakly basic anion exchange resin, which resin has been converted to the salt form by treatment with a mineral acid, to separate the remainder of the aconitic acid therefrom as resin aconitate and to produce a substantially aconitic acid-free molasses, washing the resin aconitate to remove molasses therefrom, eluting the aconitic acid from the resin with dilute sulphuric acid to form an effluent containing sulphuric acid and aconitic acid, utilizing at least part of such effluent acid to treat the precipitated aconitates to remove calcium from the aconitates and sulphuric acid from the effluent in the form of calcium sulfate, separating the calcium sulfate formed, passing the resulting solution through a cation exchanger to remove cations therefrom and decolorizing and concentrating the solution to crystallize aconitic acid therefrom, whereby aconitic acid is recovered from both the precipitated aconitate and from the anion exchange treatment by the same crystallizing operation.

6. The further improvement in the process of claim 5 in which the effluent from the elution of the aconitic acid from the resin is fractionated to give a fraction rich in aconitic acid and low in sulphuric acid and a fraction low in aconitic acid and rich in sulphuric acid and in which the latter fraction is utilized to treat the precipitated aconitates and the fraction rich in aconitic acid is combined with the solution resulting from such treatment.

7. The process according to claim 5 in which approximately ⅔ of the aconitic acid content of the molasses is precipitated as alkaline earth aconitates and in which the sulphuric acid used for elution of the aconitic acid from the resin is in amount sufficient to treat the precipitated aconitates to remove calcium therefrom as calcium sulfate.

8. The method of treating blackstrap molasses for the recovery of aconitic acid therefrom which comprises diluting and treating the same to precipitate part of the aconitic acid content thereof in the form of alkaline earth aconitates, passing the resulting defecated aconitate-containing blackstrap molasses in contact with a body of a weakly basic anion exchange resin, which resin has been converted to the salt form by treatment with a mineral acid, to effect a combination of the aconitic acid content of the molasses with the resin as resin aconitate, with release of the mineral acid of the resin salt, and with adsorption of coloring matter from the molasses by the resin, washing the body of resin aconitate to remove molasses therefrom, eluting the coloring matter and aconitic acid from said body by treatment with a dilute solution of a mineral acid passed through the resin body at a slow rate to allow the resin and eluting solution to approach equilibrium conditions, whereby an eluate fraction is first obtained containing most of the coloring matter, followed by an eluate fraction rich in aconitic acid and poor in sulfuric acid and a later fraction poor in aconitic acid and rich in mineral acid, and utilizing at least part of said eluate fractions containing sulfuric acid to treat the precipitated aconitates to set free aconitic acid therefrom.

R. WINSTON LIGGETT.
ERNEST L. WIMMER.

References Cited in the file of this patent

UNITED STATES PATENTS

| Number | Name | Date |
|---|---|---|
| 2,253,061 | Cole | Aug. 19, 1941 |
| 2,341,907 | Cheetham et al. | Feb. 15, 1944 |
| 2,345,079 | Ventre et al. | Mar. 28, 1944 |
| 2,388,195 | Vallez | Oct. 30, 1945 |
| 2,388,222 | Behrman | Oct. 30, 1945 |
| 2,470,500 | Lawrence | May 17, 1949 |
| 2,481,557 | Ambler et al. | Sept. 13, 1949 |
| 2,514,010 | Reeves | July 4, 1950 |

OTHER REFERENCES

Dickinson, Chem. Abst., vol. 42, col. 8002 (1948).
Mariani, Chem. Abst., vol. 42, col. 8002 (1948).
Garino, Chem. Abst., vol. 42, col. 8003 (1948).